United States Patent [19]

Sakura et al.

[11] Patent Number: 4,500,893

[45] Date of Patent: Feb. 19, 1985

[54] THERMAL-PRINTING DEVICE WITH DEFECTIVE RESISTIVE HEATING ELEMENT DETECTION MODE

[75] Inventors: Yasuhiro Sakura, Mishima; Yoshihiro Takai, Shizuoka; Michio Suzuki, Mishima, all of Japan

[73] Assignee: Tokyo Electric Co., Ltd., Tokyo, Japan

[21] Appl. No.: 601,552

[22] Filed: Apr. 18, 1984

[30] Foreign Application Priority Data

Apr. 28, 1983 [JP] Japan .................................. 58-75949

[51] Int. Cl.$^3$ ........................ G01D 15/10; H05B 1/02; H05B 1/00; B41J 3/20

[52] U.S. Cl. ................................ 346/76 PH; 219/216; 219/506; 400/120

[58] Field of Search ............. 346/46, 76 PH; 400/120; 219/216

[56] References Cited

U.S. PATENT DOCUMENTS

| | | | |
|---|---|---|---|
| 3,467,810 | 9/1969 | Cady, Jr. . | |
| 4,369,354 | 1/1983 | Goedecke et al. .................. | 219/506 |
| 4,453,166 | 6/1984 | Enot .................................... | 346/1.1 |

*Primary Examiner*—E. A. Goldberg
*Assistant Examiner*—Gerald E. Preston
*Attorney, Agent, or Firm*—Frishauf, Holtz, Goodman & Woodward

[57] ABSTRACT

A thermal-printing device prints by selectively supplying a current to a plurality of heat generating elements in accordance with printing data. In a check mode, the thermal-printing device sequentially supplies a check current to the heat generating elements through a light-emitting diode and a current-limiting resistor.

20 Claims, 15 Drawing Figures

THERMAL-PRINTING DEVICE WITH DEFECTIVE RESISTIVE HEATING ELEMENT DETECTION MODE

BACKGROUND OF THE INVENTION

The present invention relates to a thermal-printing device which performs thermal printing by selectively flowing a current to a plurality of heat generating elements.

Thermal-printing devices are generally divided into two types; those which print on a heat sensitive paper sheet and those which print on a paper sheet through an ink ribbon coated with a thermally melting ink. A thermal-printing device of either type can print clearer data than a line printer or the like. Furthermore, with recent developments in semiconductor techniques, heat generating elements can be formed at a finer pitch, which results in printing at a resolution as high as 8 dots/mm. Therefore, a thermal-printing device can print fine images including characters or halftone portions with high quality reproduction characteristics. In view of such advantages, thermal-printing devices are being used not only in the field of OA equipment such as in facsimile system but also in the field of bar code printing.

A bar code is used to express a number having a plurality of digits in a form such that each digit has 7 modules in accordance with a relevant standard such as the Japanese Article Numbering system (JAN), the Universal Product Code (UPC), and the European Article Numbering system (EAN). The 7 modules of a digit "5" including an odd parity, for example, are expressed by "0110001" (where "1" represents black). Each module corresponds to a width of 0.33 mm if the magnification factor is 1. A standard version is formed of 13 digits for each such number, each digit being expressed by 7 modules. The standard version is read by a laser scanner or the like and is registered in a register.

FIG. 1 show a conventional thermal-printing device. The thermal-printing device has 256 resistors or heat generating elements R1 to R256, and 256 diodes D1 to D256 each having its anode connected to the one terminal of a corresponding resistor. In the device shown in FIG. 1, these resistors R1 to R256 and diodes D1 to D256 are divided into eight groups. Thus, each group includes 32 resistors and 32 diodes. The other terminal of each of the resistors R1 to R32 and R225 to 256 in the first and eighth groups is connected to a common node and thence to a power supply terminal VC through a pnp transistor TR1. The other terminal of each of the resistors R33 to R64 and R193 to R224 of the second and seventh groups is connected to a common node and thence to the power supply terminal VC through a pnp transistor TR2. Similarly, the other terminal of each of the resistors R65 to R96 and R161 to R192 of the third and sixth groups, and the other terminal of each of the resistors R97 to R128 and R129 to R160 of the fourth and fifth groups are connected to corresponding common nodes and thence to the power supply terminal VC through respective pnp transistors TR3 and TR4.

The thermal-printing device shown in FIG. 1 further has a data generator 1 for generating timing signals and printing data, a common electrode selection circuit 2 which controls the conduction state of the transistors TR1 to TR4 in response to the timing signals from the data generator 1, and latch circuits 3 and 4 which latch first and second printing data, respectively, from the data generato 1. The latch circuit 3 has first to 32nd output terminals which are respectively connected to the cathodes of the first to 32nd diodes of each of the first to fourth groups of diodes. The latch circuit 4 has first to 32nd output terminals which are respectively connected to the cathodes of the first to 32nd diodes of each of the fifth to eighth groups of diodes.

The data generator 1 includes a data processor which generates a timing signal at a predetermined interval and generates the first and second printing data stored in a memory. In response to the timing signal from the data generator 1, the selection circuit 2 supplies the selection signals shown in FIGS. 2(A) to 2(D) to the transistors TR1 to TR4 so as to sequentially turn them on. When a low-level signal is supplied to the base of the transistor TR1, for example, the transistor TR1 is turned on. Then, a power supply voltage is supplied to the resistors R1 to R32 and R225 to R256 of the first and eighth groups through the transistor TR1. As shown in FIG. 2(E), a current flows through selected ones of the resistors R1 to R32 and R225 to R256 corresponding to those of the diodes D1 to D32 and D225 to D256 which are selected in accordance with the printing data stored in the latch circuits 3 and 4, as shown in FIG. 2(E). The selected resistors are heated. A similar operation is repeated and the data stored in the latch circuits 3 and 4 is sequentially printed on a recording paper sheet. In this case, in synchronism with the printing operation, the recording paper sheet is fed in a predetermined direction to make a label on which the item name, price, weight and the like are printed, as shown in FIG. 3.

When a bar code is printed, if one heat generating element is broken, the code "0110001" representing a number "5" is erroneously printed as a different code "0100001" or "0110000". However, when a printed bar code is read, either a check digit calculation or a parity check is performed. Therefore, a bar code which is erroneously printed almost never leads to a reading error.

However, since a bar code is printed and read even if a single heat generating element has broken down, the operator cannot easily detect a broken down element. Checking for a broken down element through printed bar codes is time- and labor-consuming.

SUMMARY OF THE INVENTION

It is an object of the present invention to provide a thermal-printing device which can easily detect whether at least one of a plurality of heat generating elements has broken down.

The object of the present invention can be achieved by a thermal-printing device comprising a plurality of heat generating elements, a first current path, a second current path including a current-limiting element, a current detection circuit for detecting a current flowing through the second current path, a switching circuit which is set to couple one terminal of each of said plurality of heat generating elements to a power supply terminal through said first and second current paths in a printing mode and a check mode, respectively, and a potential setting circuit which has a plurality of output terminals respectively coupled to the other terminals of said plurality of heat generating elements, and which selectively sets potentials of said output terminals at a predetermined potential level to cause a bias current to flow through corresponding ones of said plurality of heat generating elements in accordance with input data in the printing mode, which sequentially sets the potentials of said output terminals at the predetermined potential level in the check mode.

According to the present invention, when a current is sequentially flowed to the heat generating elements in the check mode, the current is suppressed below a predetermined value by means of the current-limiting element. Therefore, no adverse effect acts on the recording paper sheet. When the current is detected to have flowed to the second current path in the check mode, a print stop signal is generated by the current detection circuit. Therefore, a broken down element can be checked without adversely affecting the printing operation.

DETAILED DESCRIPTION OF THE PREFERRED EMBODIMENTS

Figure 1:
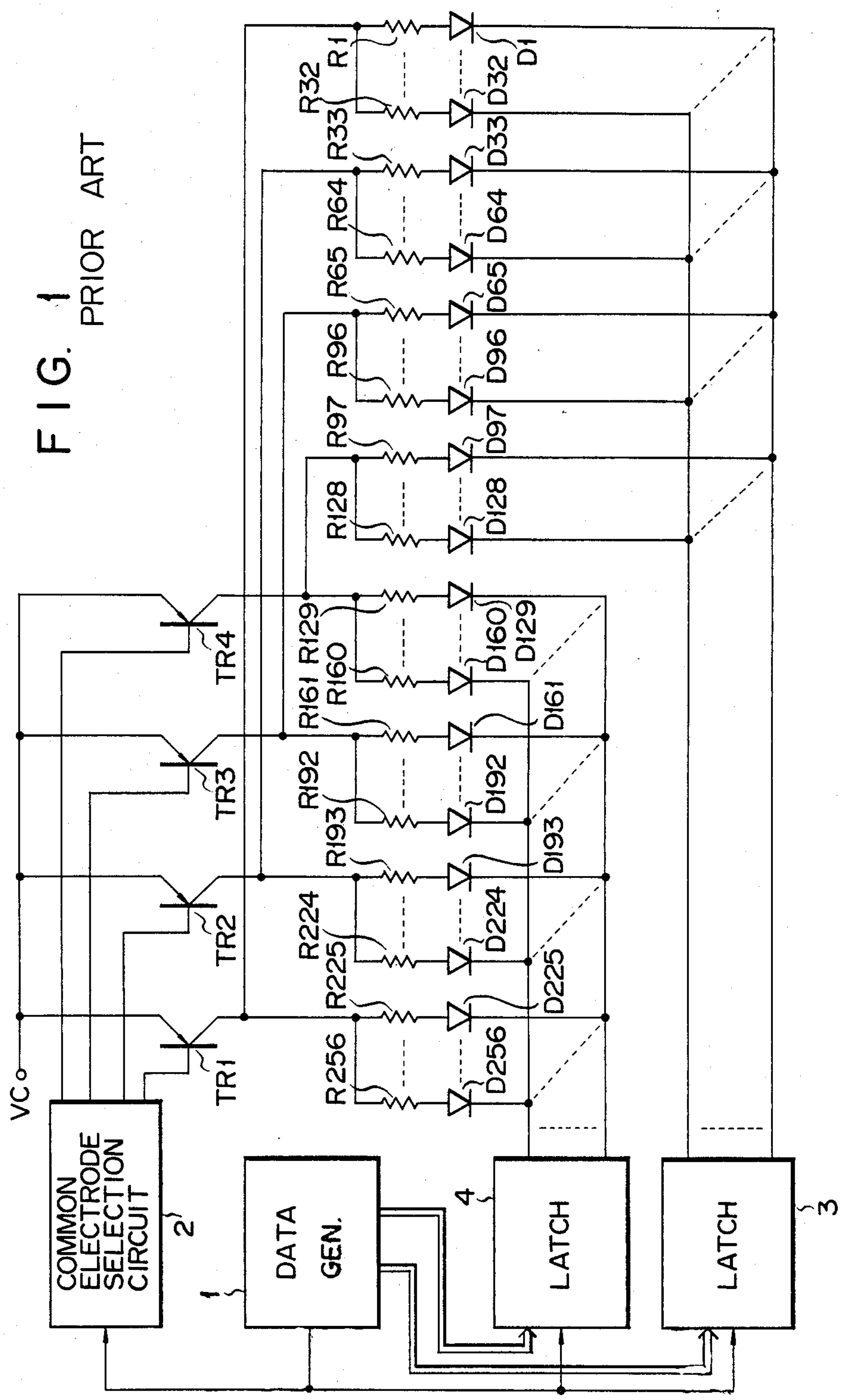
FIG. 1 PRIOR ART
FIG. 1 is a circuit diagram of a conventional thermal-printing device.
Figure 2:
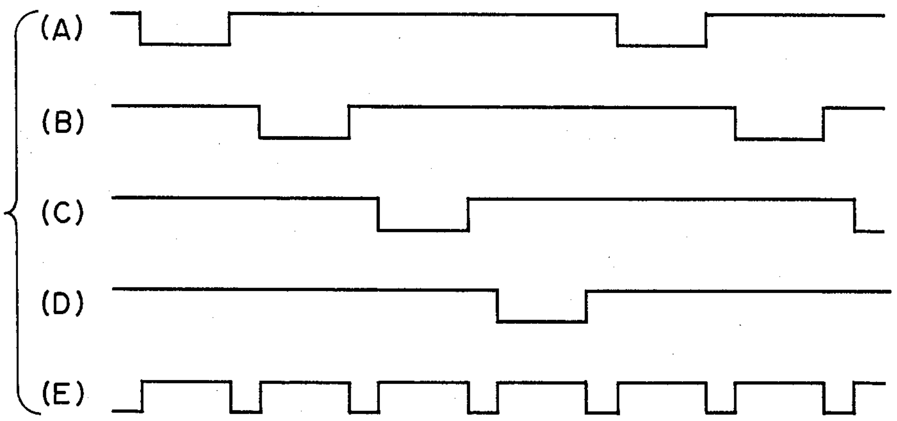
FIG. 2 PRIOR ART
FIGS. 2(A) to 2(E) show signal waveforms for explaining the mode of operation of the thermal-printing device shown in FIG. 1.
Figure 3:
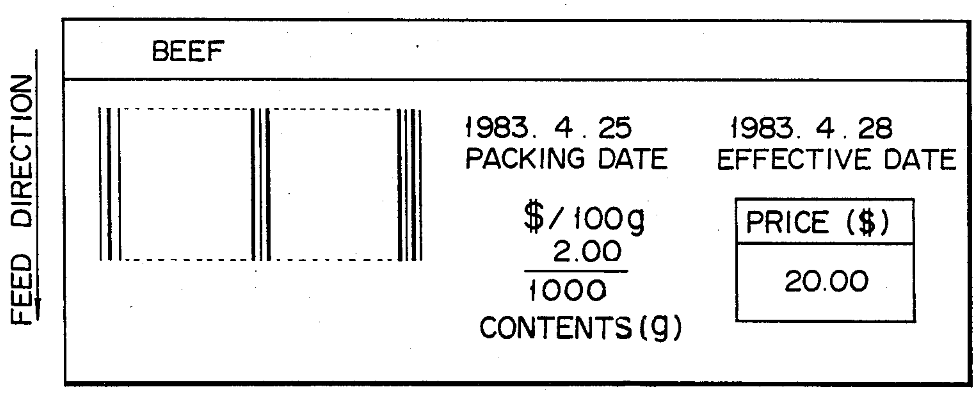
FIG. 3 PRIOR ART
FIG. 3 shows an example of a recording paper sheet on which data is printed by the thermal-printing device shown in FIG. 1.
Figure 4:
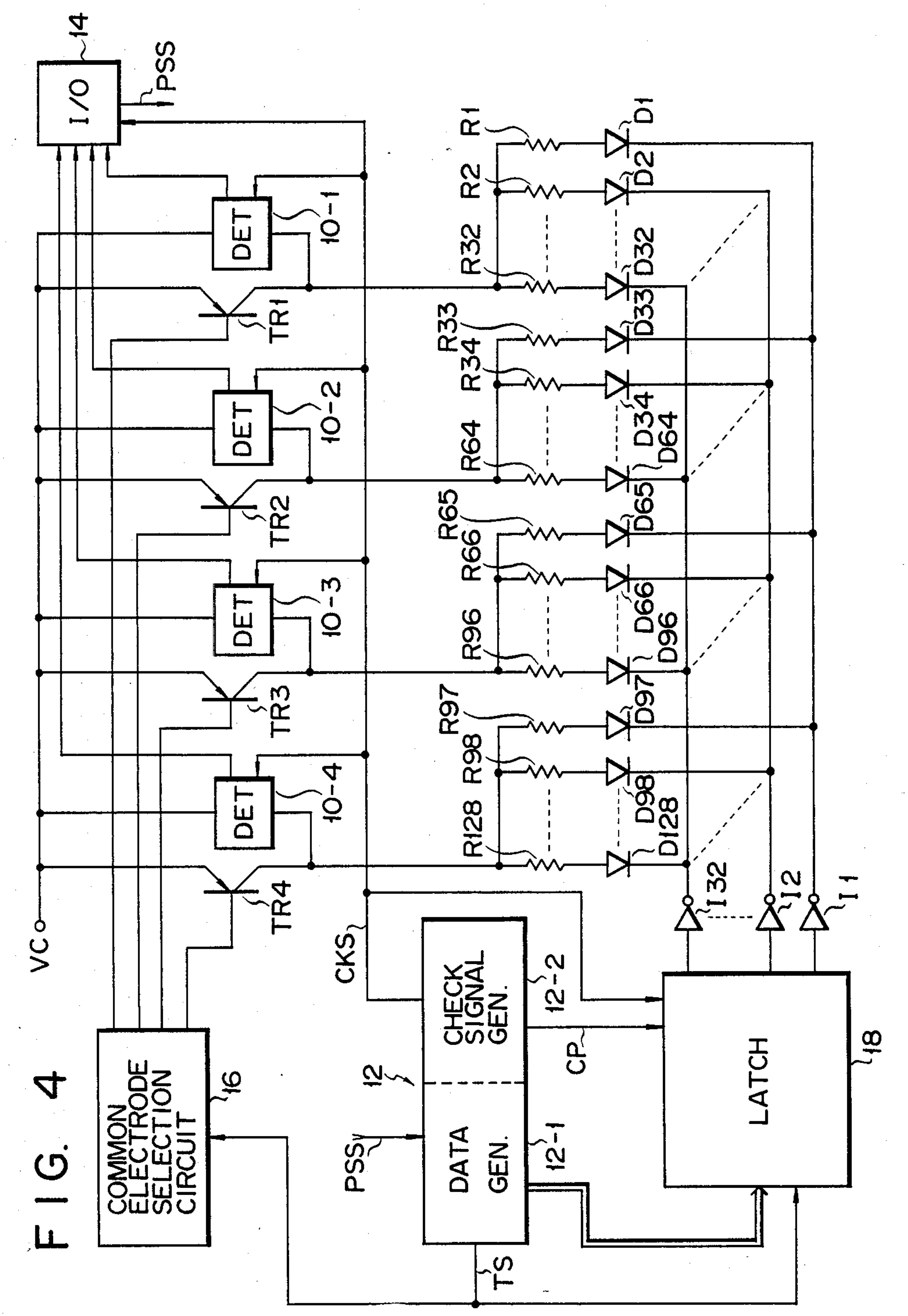
FIG. 4 is circuit diagram of a thermal-printing device according to an embodiment of the present invention.

FIG. 4 is a circuit diagram showing a thermal-printing device according to an embodiment of the present invention. As in the case of the conventional thermal-printing device shown in FIG. 1, the thermal-printing device of this embodiment has pnp transistors TR1 to TR4, resistors R1 to R128, and diodes D1 to D128 having anodes connected to the corresponding resistors R1 to R128. The thermal-printing device of this embodiment further has breakdown detector circuits 10-1 to 10-4 which are respectively connected to the first to fourth resistor groups R1 to R32, R33 to R64, R65 to R96 and R97 to R128 and which detect whether the corresponding resistor are cut off; a control circuit 12 which has a data generating section 12-1 for generating timing signals and printing data and a check signal generating section 12-2 for generating a check signal CKS and a clock pulse CP; and an I/O device 14 which supplies a print stop signal PSS to the data generating section 12-1 in response to an output signal from the breakdown detector circuits 10-1 to 10-4. The data generating section 12-1 supplies a timing signal TS to a common electrode selection circuit 16 having a similar function to that of the selection circuit 2 shown in FIG. 1, and also supplies the timing signal TS and the printing data to a latch circuit 18. The 32 output terminals of the latch circuit 18 are respectively connected to the cathodes of the first to fourth groups of diodes D1 to D32, D33 to D64, D65 to D96 and D97 to D128, through inverters I1 to I32.

The latch circuit 18 includes, for example, a 33-stage shift register circuit. The second to 33rd shift registers of the shift register circuit latch the 32-bit data from the data generating section 12-1 in response to a timing signal, and produce 32 bit signals from their output terminals to the inverters I1 to I32. The shift register circuit stores "1" in the first stage and "0" in the second to 33rd stages in response to the leading edge of a check signal CKS from the check signal generating section 12-2. Furthermore, the shift register circuit sequentially shifts "1" stored at the first shift register in response to the 32 clock pulses CP generated during the generator period of the check signal CKS. In this manner, the latch circuit 18 and the inverters I1 to I32 serve as a potential setting circuit for selectively setting the cathode potentials of the diodes D1 to D128 in accordance with the input data.

Since the breakdown detector circuits 10-1 to 10-4 are all of the same configuration, the case of the breakdown detector circuit 10-1 will be described with reference to FIG. 5. The breakdown detector circuit 10-1 has a pnp transistor TR10 having an emitter coupled to a power supply terminal VC and a collector connected to the first group of resistors R1 to R32 shown in FIG. 4 through a series circuit of a light-emitting diode LED1 and a resistor RX, a series circuit of a light-emitting diode LED2 and a resistor RY which is parallel-connected to the series circuit of the light-emitting diode LED1 and the resistor RX, and a phototransistor TR11 having a grounded emitter and a collector connected to the power supply terminal VC through a resistor. The light-emitting diode LED1 and the phototransistor TR11 together constitute a photocoupler. The base of the transistor TR10 is connected to the control circuit 12, and the collector of the phototransistor TR11 is connected to the I/O device 14.

Figure 6:
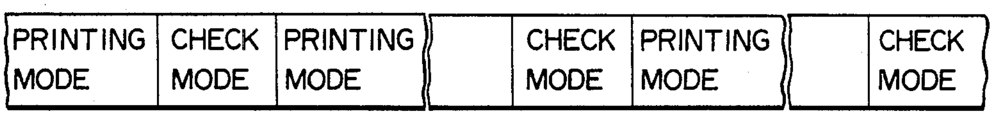
FIG. 6 shows the operation mode of the thermal-printing device shown in FIGS. 4 and 5.

The control circuit 12 is alternately set in the printing mode and the check mode, as shown in FIG. 6. In the printing mode, the data generating section 12-2 of the control section 12 operates similary to the data generator 1 shown in FIG. 1. The data generating section 12-1 supplies a timing signal TS to the common electrode selection circuit 16 so as to sequentially turn on the transistors TR1 to TR4 for a predetermined period of time, as has been described with reference to FIGS. 2(A) to 2(D). At the same time, the data generating section 12-1 supplies the printing data to the latch circuits 18 in synchronism with the timing signal TS. Those of the resistors R1 to R128 which correspond to the data to be printed are energized by a current flowing through one of the transitors TR1 to TR4, thus printing the data. In the printing mode, the check signal generating section 12-2 generates a high-level check signal CKS. Therefore, the transitors TR10 of the breakdown detector circuits 10-1 to 10-4 are kept off. The breakdown detector circuits 10-1 to 10-4 do not therefore adversely affect the printing operation.

In the check mode, the data generating section 12-1 stops generating the timing signal TS and the printing data. The check signal generating section 12-2 genertes at least one low-level check signal and 32 clock pulses during the generation period of this check signal.

Figure 7A:
FIGS. 7A to 7H show signal waveforms for explaining the thermal-printing device shown in FIGS. 4 and 5.
Figure 7B:

A case will be considered wherein the low-level check signal is generated by the check signal generating section 12-2 in the check mode. In this case, the transistors TR10 of the breakdown detector circuits 10-1 to 10-4 are turned on, and "1" is stored in the first stage of the shift register circuit constituting the latch circuit 18 in response to the leading edge of the check signal. Thereafter, when one clock pulse CP is generated, data "" is shiftedd to the second stage of the shift register circuit. A high-level output signal is generated from the first output terminal of the latch circuit 18 and is supplied to the inverter I1 as shown in FIG. 7B. Low-level output signals are produced from the remaining output terminals of the latch circuit 18. Then, the inverter I1 produces a low-level signal, and the resistors R1, R33, R65 and R97 are biased through the transistors TR1 to TR4. Similarly, when the second to 32nd clock pulses are sequentially generated, high-level output signals of a predetermined duration are produced at different timings from the second to 32nd output terminals of the latch circuit 18. If none of the resistors R1 to R128 is damaged, when the high-level signals are sequentially produced from the first to 32nd output terminals of the latch circuit 18, the light-emitting diodes LED1 and LED2 of each of the breakdown detector circuits 10-1 to 10-4 continuously emit light. Therefore, the phototransitors TR11 are not rendered off for a time period equal to or longer than the pulse duration of the clock pulse CP. In this case, while the check signal CKS is being generated, no input signal held at high level is supplied to the I/O device 14 for a predetermined period of time. Thus, the I/O device 14 does not generate a print stop signal PSS. Furthermore, the operator can confirm that the resistors R1 to R128 are not damaged by observing the continuously illuminated LEDs.

It is to be noted that since the resistors RX and RY are used as current-limiting elements, the currents flowing to the resistors R1 to R128 in the check mode are suppressed to levels below the predetermined level, so that these resistors R1 to R128 do not generate heat to cause erroneous printing on the recording paper sheet.

Figure 7C:
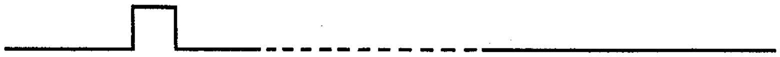

Assume now that the resistors R2 and R128 are damaged or cut off. In this case, in response to a clock pulse from the check signal generating section 12-2, if a high-level signal is generated from the second output terminal of the latch circuit 18, as shown in FIG. 7C, and a low-level signal is generated by the inverter I2, a current flows through the resitors R34, R66 and R98, but no current flows through the resistor R2. Although the light-emitting diodes LED1 and LED2 of the breakdown detector circuits 10-2 to 10-4 continue to emit light, the light-emitter diodes LED1 and LED2 of the breakdown detector circuit 10-1 stop emitting light. Therefore, the phototransistor TR11 of the breakdown detector circuit 10-1 is turned off for a time period substantially equal to the pulse duration of the clock pulse CP. Then, a high-level signal is supplied to the I/O device 14 for a predetermined period of time, as shown in FIG. 7E. The collector voltages of the phototransistors TR11 of the breakdown detector circuits 10-2 to 10-4 are respectively kept at low level, as shown in FIGS. 7F, 7G and 7H. Under these conditions, a print stop signal PSS is supplied from the I/O device 14 to the control circuit 12, so that the next printing cycle under the control circuit 12 is prohibited. In this case, the operator can confirm that one of the resistors R1 to R128 has broken down upon observing the off state of the light-emitting diodes.

Figure 7D:
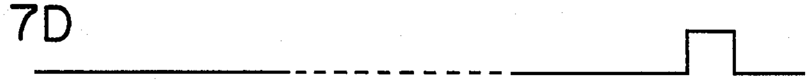
Figure 7E:
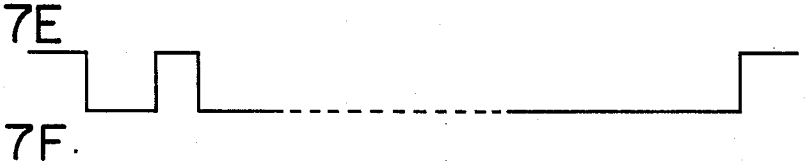
Figure 7F:
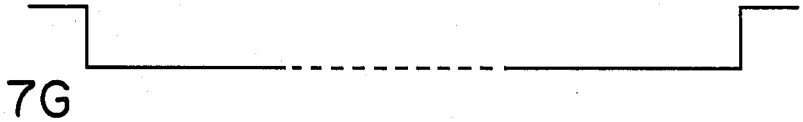
Figure 7G:
Figure 7H:
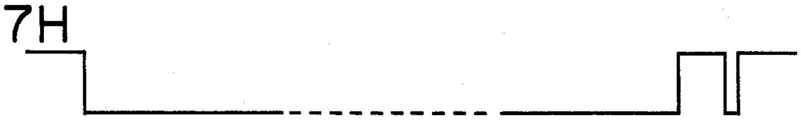

Similarly, when a high-level signal is supplied from the 32nd output terminal of the latch circuit 18, as shown in FIG. 7D, and a low-level signal is generated by the inverter I32, a current flows through the resistors R32, R64 and R94, but no current flows through the resistor R128. The light-emitting diodes LED1 and LED2 of the breakdown detector circuits 10-1 to 10-3 continue to emit light, while the light-emitting diodes LED1 and LED2 of the breakdown detector circuit 10-4 stop emitting light. Therefore, the phototransistor TR11 of the breakdown detector circuit 10-4 is turned off for a predetermined period of time, and a high-level signal is supplied to the I/O device 14, as shown in FIG. 7H. Then, the I/O device 14 produces a print stop signal PSS.

Figure 8:
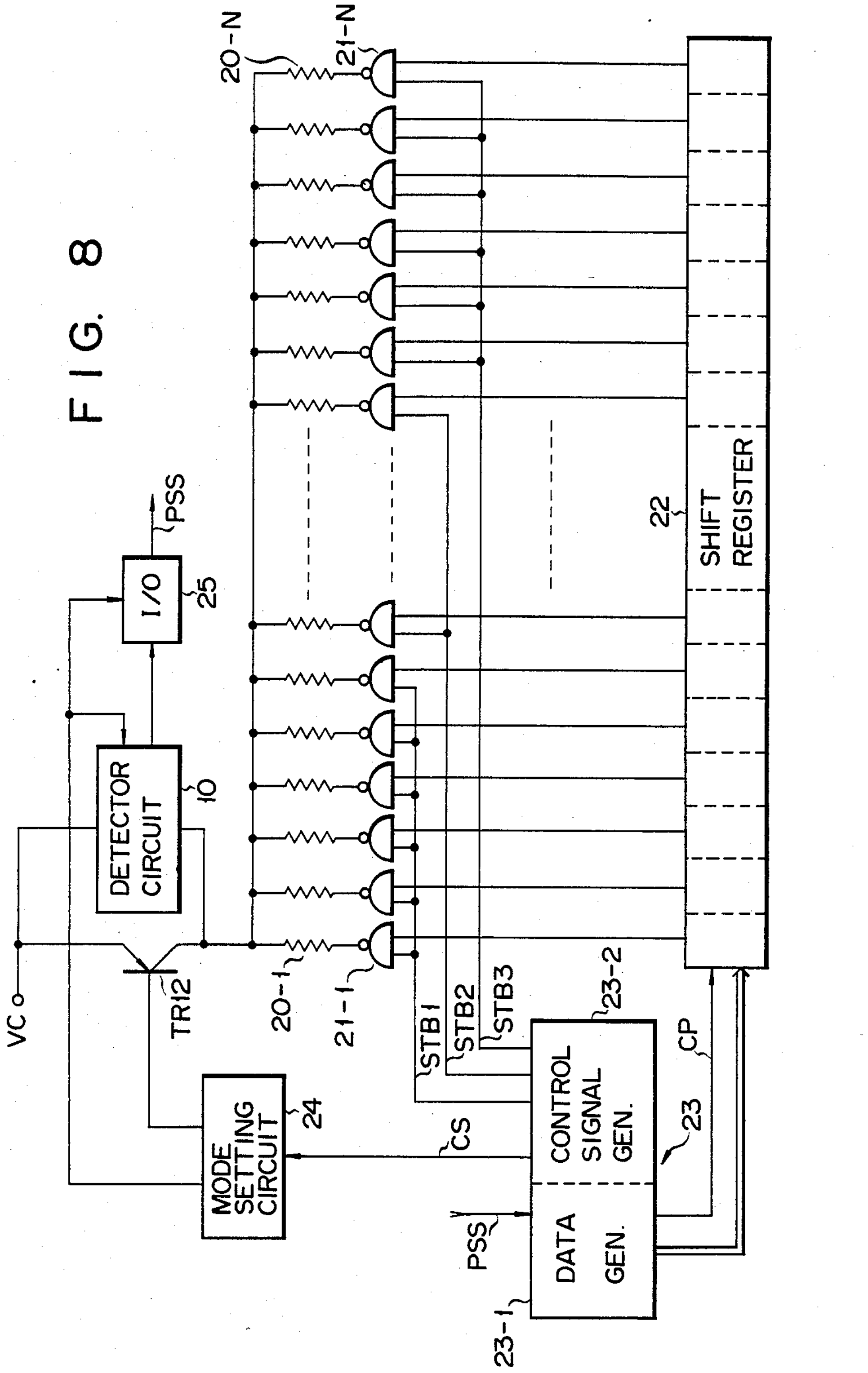
FIG. 8 is a circuit diagram of a thermal-printing device according to another embodiment of the present invention.

FIG. 8 shows a thermal-printing device according to another embodiment of the present invention. The thermal-printing device of this embodiment has resistors or heat generating elements 20-1 to 20-N each of which has one terminal conncted to a power supply terminal VC through a common transistor TR12, a breakdown detector circuit 10 having the same configuraion as that of the circuit shown in FIG. 5, NAND gates 21-1 to 21-N each having an output terminal connected to the other terminal of a corresponding one of the elements 20-1 to 20-N, and an N-stage shift register circuit 22 having N output terminals respectively connected to one input terminal of a corresponding one of the NAND gates 21-1 to 21-N. The thermal-printing device further has a control circuit 23 which, in turn, has a data generating section 23-1 for serially supplying the printing data to the shift register circuit 22, and a control signal generating section 23-2 which selectively supplies strobe signals STB1 to STB3 to the NAND gates 20-1 to 20-N, and supplies a control signal CS to a mode setting circuit 24.

According to the device of this embodiment, in the printing mode, a high-level control signal is generated by the control signal generating section 23-2, and a low-level signal is supplied to the base of the transistor TR12 from the mode setting circuit 24 so as to turn on the transistor TR12. In this case, the high-level signal is supplied from the mode setting circuit 24 to the transistor TR10 of the breakdown detector circuit 10, and the transistor TR10 is turned off. In this state, the printing data is serially supplied from the data generating section 23-1 to the shift register circuit 22. When N clock pulses are generated and all the printing data is stored in the shift register circuit 22, the control signal generating section 23-2 sequentially generates high-level strobe signals STB1 to STB3. Then, output signals from the selected ones of the NAND gates 21-1 to 21-N become low in accordance with the printing data stored in the shift register circuit 22. Then, a current flows through corresponding ones of the resistors 20-1 to 20-N, and the printing data is printed on a recording paper sheet (not shown).

In the check mode, a low-level control signal CS and high-level strobe signals STB1 to STB3 are generated by the control signal generating section 23-2. Then, the transistor TR12 is turned off, and the transistor TR10 of the breakdown detector circuit 10 is turned on. At the same time, one-bit of "1" is supplied to the shift register circuit 22, and the data "1" is stored in the first stage of the shift register circuit 22 in response to a first clock pulse generated in the check mode. Thereafter, data of "0" is continuously generated by the data generating section 23-1. Therefore, the data of "1" is sequentially shifted from the first to final stages of the shift register circuit 22 in response to the clock pulses CP. If all the resistors 20-1 to 20-N are normal, the light-emitting diodes LED1 and LED2 of the breakdown detector circuit 10 continuously emit light during the shifting operation of the data of "1" in the circuit 22. However, if at least one of the resistors 20-1 to 20-N is cut off, when the data of "1" is shifted to the corresponding stage of the shift register circuit 22, light emission by the light-emitting diodes LED1 and LED 2 of the breakdown detector circuit 10 is interrupted. In this case, a high-level signal is supplied from the breakdown detector circuit 10 to an I/O device 25. The I/O device 25 then supplies a print stop signal PSS to the data generating section 23-1 to prohibit the next printing cycle. The operator can determine that one of the resistors 20-1 to 20-N has been cut off by observing the off state of the LEDs. In this embodiment, the shift register circuit 22 and the NAND gates 21-1 to 21-N serve as a potential setting circuit for setting the potential at one terminal of each of the resistors 20-1 to 20-N.

Although the present invention has been described with reference to the particular embodiments thereof, the present invention is not limited to this. For example, in the embodiment shown in FIG. 4, 128 resistors R1 to R128 are divided into four groups. However, a different number of resistors can be used, or a selected number of resistors can be divided into a different number of groups.

Figure 5:
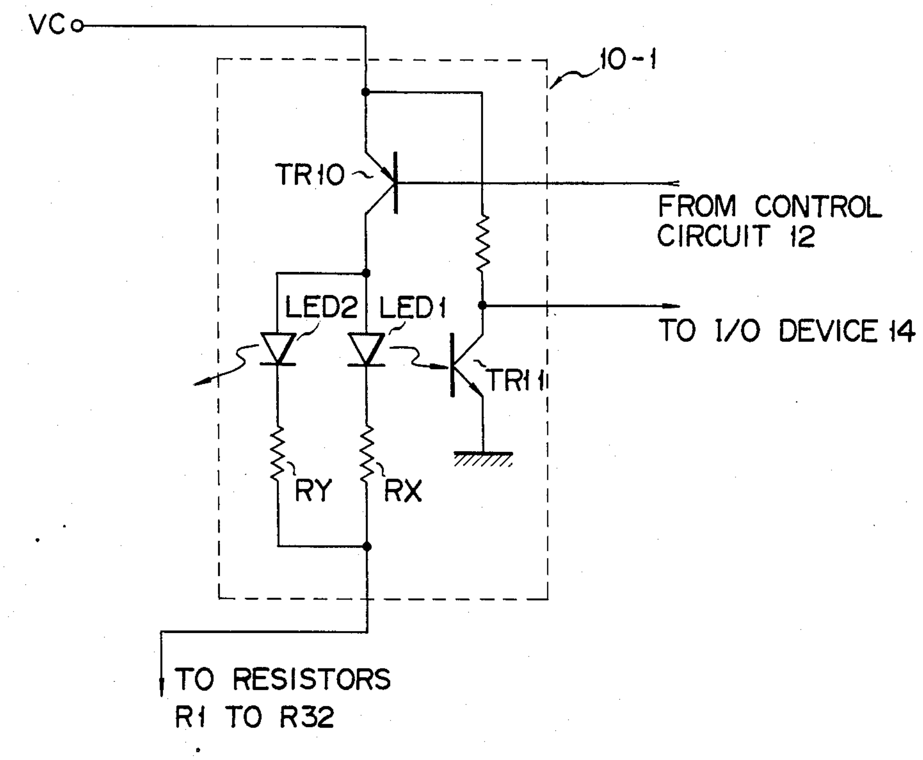
FIG. 5 is a breakdown detector circuit used in the circuit shown in FIG. 4.

In the breakdown detector circuit shown in FIG. 5, the light-emitting diode LED1 and the phototransistor TR11 can be omitted. Instead, a comparator can be used which compares the potential at one end of the resistor RX which is connected to the resistors R1 to R32 with a predetermined potential, and produces an output signal when the former is higher than the latter.

What is claimed is:

1. A thermal-printing device comprising:

a power supply terminal set at a predetermined potential;

a pluraltiy of heat generating means;

a first current path;

a second current path including current limiting means;

current detecting means for generating a control output signal upon detecting a flow of a current through said second current path;

switching means set to connect one terminal of each of said plurality of heat generating elements to said power supply terminal through said first and second paths in a printing mode and a check mode, respectively; and potential setting means, having a plurality of output terminals each connected to the other terminal of a corresponding one of said plurality of heat generating elements, for selectively setting potentials at said output terminals at a predetermined potential level in accordance with input data to selectively flow a current through said plurality of heat generating elements in the printing mode, and for sequentially setting the potentials at said output terminals at said predetermined potential level to sequentially flow a check current through said plurality of heat generating elements in the check mode.

2. A thermal-printing device according to claim 1, wherein said potential setting means has a latch circuit and inverting means for inverting output data from said latch circuit.

3. A thermal-printing device according to claim 2, wherein said switching means has first and second switching elements which are series-connected to said first and second current paths.

4. A thermal-printing device according to claim 3, wherein said current detecting means has a light-emitting diode series-connected to said second current path, and a phototransistor which, together with said light-emitting diode, constitutes a photocoupler.

5. A thermal-printing device according to claim 3, wherein said current detecting means has a light-emitting diode series-connected to said second current path.

6. A thermal-printing device according to claim 3, wherein said current limiting means has first and second resistors, and said current detecting means has first and second light-emitting diodes respectively series-connected to said first and second resistors, and a phototransistor which, together with said light-emitting diode, constitutes a photocoupler.

7. A thermal-printing device according to claim 2, wherein said current detecting means has a light-emitting diode series-connected to said second current path, and a phototransistor which, together with said light-emitting diode, constitutes a photocoupler.

8. A thermal-printing device according to claim 2, wherein said current detecting means has a light-emitting diode series-connected to said second current path.

9. A thermal-printing device according to claim 2, wherein said current limiting means has first and second resistors, and said current detecting means has first and second light-emitting diodes respectively series-connected to said first and second resistors, and a phototransistor which, together with said light-emitting diode, constitutes a photocoupler.

10. A thermal-printing device according to claim 1, wherein said potential setting means has a shift register circuit, and a plurality of NAND gates each of which receives corresponding bit data from said shift register circuit at one input terminal thereof and a strobe signal at the other input terminal thereof.

11. A thermal-printing device according to claim 1, wherein said current detecting means has a light-emitting diode series-connected to said second current path, and a phototransistor which, together with said light-emitting diode, constitutes a photocoupler.

12. A thermal-printing device according to claim 1, wherein said current detecting means has a light-emitting diode series-connected to said second current path.

13. A thermal-printing device according to claim 1, wherein said current limiting means has first and second resistors, and said current detecting means has first and second light-emitting diodes respectively series-connected to said first and second resistors, and a phototransistor which, together with said light-emitting diode, constitutes a photocoupler.

14. A thermal-printing device according to claim 13, wherein said current detecting means has a light-emitting diode series-connected to said second current path, and a phototransistor which, together with said light-emitting diode, constitutes a photocoupler.

15. A thermal-printing device according to claim 13, wherein said current detecting means has a light-emitting diode series-connected to said second current path.

16. A thermal-printing device according to claim 13, wherein said current limiting means has first and second resistors, and said current detecting means has first and second light-emitting diodes respectively series-connected to said first and second resistors, and a phototransistor which, together with said light-emitting diode, constitutes a photocoupler.

17. A thermal-printing device according to claim 13, wherein said switching means has first and second switching elements which are series-connected to said first and second current paths.

18. A thermal-printing device according to claim 17, wherein said current detecting means has a light-emitting diode series-connected to said second current path, and a phototransistor which, together with said light-emitting diode, constitutes a photocoupler.

19. A thermal-printing device according to claim 17, wherein said current detecting means has a light-emmitting diode series-connected to said second current path.

20. A thermal-printing device according to claim 17, wherein said current limiting means has first and second resistors, and said current detecting means has first and second light-emitting diodes respectively series-connected to said first and second resistors, and a phototransistor which, together with said light-emitting diode, constitutes a photocoupler.

* * * * *